United States Patent [19]
Nambu

[11] 3,750,401
[45] Aug. 7, 1973

[54] EXHAUST GAS AFTER-BURNING SYSTEM FOR AUTOMOTIVE INTERNAL COMBUSTION ENGINE

[75] Inventor: Shyuya Nambu, Yokohama, Japan

[73] Assignee: Nissan Motor Company, Limited, Yokohama City, Japan

[22] Filed: Dec. 7, 1971

[21] Appl. No.: 205,696

[30] Foreign Application Priority Data
Dec. 28, 1970 Japan.................... 45/119924

[52] U.S. Cl...................... 60/286, 60/290, 60/294, 60/303
[51] Int. Cl............................................. F01n 3/14
[58] Field of Search ............................ 60/286–291, 294, 303, 307

[56] References Cited
UNITED STATES PATENTS

| | | | |
|---|---|---|---|
| 3,060,678 | 10/1962 | Ridgway | 60/294 |
| 3,203,168 | 8/1965 | Thomas | 60/286 |
| 3,306,035 | 2/1967 | Morrell | 60/286 |
| 3,218,134 | 11/1965 | Walsh | 60/303 X |
| 3,603,080 | 9/1971 | McCrocklin | 60/303 X |
| 3,657,893 | 4/1972 | Tadokoro et al. | 60/289 |
| 2,880,079 | 3/1959 | Cornelius | 60/303 X |
| 3,648,455 | 4/1972 | Muroki | 60/278 |

*Primary Examiner*—Carlton R. Croyle
*Assistant Examiner*—Robert E. Garrett
*Attorney*—John Lezdey

[57] ABSTRACT

An exhaust gas after-burning system for reducing vehiclular air pollution, which system includes a reactor for re-oxidizing the unburned components of engine exhaust gases, such as hydrocarbons and carbon monoxides. A fuel supply unit is incorporated in the system for supplying secondary fuel in controlled quantities to the reactor. The system also includes an air supply unit for suppying air in controlled quantities to the reactor. The quantities of the secondary fuel and air supplied to the reactor increase with engine loads, the air-fuel ratio of the mixture being kept low, for example, of the order of 20:1 to 50:1. The combustible mixture of the secondary fuel and air is ignited within the reactor by an ignition plug, so that the exhaust's unburned gases are burned completely. The fuel supply unit includes a check valve having a pressure chamber and adapted to be opened to allow the fuel flow from the pressure chamber to the reactor therethrough when the pressure within the pressure chamber exceeds a predetermined value. A fuel pump is provided for delivering the secondary fuel from a fuel tank to the pressure chamber. In response to engine loads, a solenoid valve operates to control the return flow of the secondary fuel from the pressure chamber to the fuel tank to thereby vary the fuel pressure within the chamber, so that the quantity of secondary fuel supplied to the reactor is controlled.

11 Claims, 4 Drawing Figures

EXHAUST GAS AFTER-BURNING SYSTEM FOR AUTOMOTIVE INTERNAL COMBUSTION ENGINE

This invention relates to an exhaust gas after-burning system for an internal combustion engine of a motor vehicle. More particularly, it relates to such a system incorporating a control device adapted to control the amount of fuel injected into an exhaust gas reactor in accordance with engine loads.

In the operation of gasoline powered internal combustion engines, a large quantity of unburned gases are discharged into the atmosphere from the exhaust systems. Such unburned gases contain noxious components such as hydrocarbons and carbon monoxides, causing air polution in cities where a number of motor vehicles run. To solve this problem, various devices for promoting re-oxidation of the hydrocarbons and carbon monoxides emitted from the engines have been developed, including exhaust gas reactors. One form of such reactors comprises a combustion apparatus provided intermediate an exhaust pipe and including a fuel supply system for supplying secondary fuel into the combustion apparatus. In the reactor of this type, re-oxidation of the unburned gases is accomplished by igniting the supplied secondary fuel and passing the unburned gases through the high temperature portion of the apparatus or bringing the gases into direct contact with the burning fuel. The performance of this exhaust gas reactor depends upon the amount of exhaust gases emitted from the engine. Thus, in order to assure perfect combustion of the unburned gases at all times and with the utmost fuel economy, it is necessary to provide optimum control of the amount of secondary fuel supplied to the reactor.

It is a primary object of the invention to provide an improved type of exhaust gas after-burning system of a motor vehicle.

Another object of the invention is to provide an improved exhaust gas after-burning system including a fuel control device adapted to control the amount of secondary fuel injected into a reactor for after-burning the exhaust gases.

A further object of the invention is to provide a novel fuel control system for controlling the amount of fuel supply in accordance with a certain factor of the engine drive conditions.

These and other objects will be readily apparent from the following description of embodiments of the invention when read in conjunction with the accompanying drawings, in which.

Figure 1:
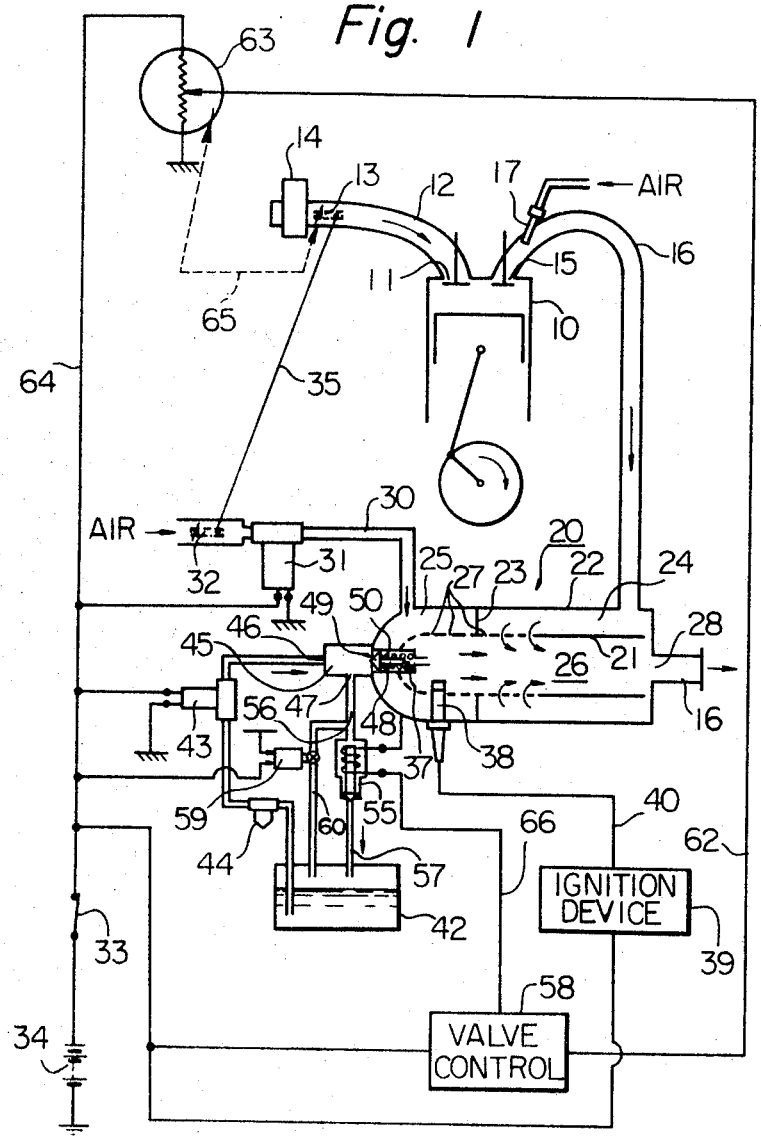
FIG. 1 is a schematic diagram of an exhaust gas after-burning system embodying the principles of this invention.

Referring now to FIG. 1, one preferred example of an exhaust gas after-burning system of the invention is shown as incorporated in a common automotive internal combustion engine having a cylinder 10. The engine cylinder 10 is connected at its suction port 11 to an intake manifold 12 having a throttle valve 13 provided therein and thence to an air cleaner 14, so as to be supplied with a combustible mixture of air and fuel. The engine cylinder 10 is also connected at its exhaust port 15 to a main exhaust pipe 16 to discharge the exhaust gases therefrom.

As shown, the main exhaust pipe 16 is provided near the engine cylinder 10 with a nozzle 17 for injecting air into the exhaust pipe 16. The nozzle 17 is connected to an air pump (not shown) which delivers air under pressure from a source (not shown) to the nozzle 17. The air thus injected facilitates the re-oxidation of the unburned components of the exhaust gases within the exhaust pipe 16 at high exhaust temperatures.

However, when the exhaust temperature is low enough as during warm-up operation or at low engine loads, the re-oxidation of the unburned gases does not occur satisfactorily even with the addition of air as described above, and accordingly the exhaust gases containing a considerable amount of such noxious, unburned components are emitted to the atmosphere, causing air pollution.

An exhaust gas reactor 20, often called an after burner, is provided intermediate the main exhaust pipe 16 in order to assure perfect combustion of the unburned gases such as hydrocarbons and carbon monoxides even at low exhaust temperatures. The exhaust gas reactor 20 includes an inner casing 21 and an outer casing 22, both being of generally cylindrical shape. A space defined between the two casings 21 and 22 is divided by a partition wall 23 into two chambers 24 and 25. These outer chambers 24, 25 are communicated with an inner combustion chamber 26 defined in the inner casing 21 through a plurality of openings 27 formed in the inner casing 21. The outer chamber 24 is also connected to the main exhaust pipe 16 so as to be supplied with the exhaust gases which in turn are passed through the openings 27 into the inner chamber 26. In this instance, it is important to have the openings 27 communicating the outer chamber 24 with the inner chamber 26 formed near the partition wall 23 for reasons to be described later. The inner chamber 26 is connected to the main exhaust pipe 16 through an opening 28 formed in one end wall of the inner casing 21, the exhaust pipe 16 being connected to a muffler (not shown).

The other outer chamber 25 of the reactor 20 is connected through a conduit 30 to an electric air pump 31 and thence to an air flow control valve 32. The air pump 31 is electrically connected through an engine switch 33 to a battery 34 so that when the engine switch 33 is closed the air pump 31 operates to deliver secondary air to the outer chamber 25 and then to the inner combustion chamber 26. The amount of secondary air supplied to the inner combustion chamber 26 is controlled by the air flow control valve 32 which is operatively connected through a suitable mechanical linkage 35 with the throttle valve 13. As throttle valve opening increases, the control valve 32 is progressively opened to allow more air to flow therethrough into the combustion chamber 26.

The exhaust gas reactor 20 further includes a fuel injection nozzle 37 and an ignition plug 38. The injection nozzle 37 is mounted in the other end wall of the cylindrical inner casing 21 to inject fuel thereinto in a sprayed form. The ignition plug 38 also is mounted in the inner casing 21 in a position suitable for firing a combustible mixture of the air and fuel injected. An ignition device 39 is provided for supplying high-voltage surges of current having a certain frequency to the ignition plug 38 through a conductor 40. The ignition device 39 is also connected through the engine switch 33 to the battery 34 so that closure of the engine switch 33 starts the firing at the ignition plug 38.

The fuel injection nozzle 37 forms part of an improved fuel supply unit for supplying secondary fuel to the exhaust gas reactor 20. The fuel supply unit comprises a fuel tank or reservoir 42 for storing the secondary fuel, which in the illustrated embodiment is provided separately from a fuel tank (not shown) for storing fuel to be supplied to the engine cylinder 10. A fuel pump 43 is provided for delivering the secondary fuel from the fuel tank 42 through a filter 44 to a pressure chamber 45. The fuel pump 43 is of the conventional type driven by a motor which is electrically connected through the engine switch 33 to the battery 34 so as to be activated upon closure of the engine switch 33.

The pressure chamber 45 has an inlet port 46 connected to the fuel pump discharge, and an outlet port 47 for delivering the secondary fuel back to the fuel tank 42. The pressure chamber 45 further has an opening forming an inlet of a normally closed check valve 48 integrally formed on the outer wall of the pressure chamber 45. The check valve 48 includes a movable control element 49 which is biased toward the inlet opening by a spring member 50 provided therein, so as to block communication between the pressure chamber 45 and the valve chest or chamber of the check valve 48. The check valve 48 has a projecting spout forming the fuel injection nozzle 37 of the exhaust gas reactor 20. Thus, when the fuel pressure within the pressure chamber 45 exceeds a certain value as determined by the strength of the spring member 50, the control element 49 is moved away from the inlet opening against the action of the spring 50, so that the check valve 48 is opened, allowing the flow of secondary fuel into the reactor combustion chamber 26 through the nozzle 37. The secondary fuel thus injected mixes with the air supplied from the air pump 31 and is ignited by the ignition plug 38 for combustion.

The engine exhaust gases containing a considerable amount of noxious hydrocarbons and carbon monoxides are, as described above, supplied with additional air from the injection nozzle 17, while being discharged through the exhaust pipe 16. Since, at low exhaust gas temperatures, the resultant oxygen-rich exhaust gas mixture is not burned completely within the exhaust pipe 16, the gas mixture is passed to the outer chamber 24 of the reactor 20 and enters the inner combustion chamber 26 through the openings 27. With the provision of the openings 27 in positions not remote from the partition wall 23 as described above, the exhaust gas mixture thus entering is wholly brought into firing contact with the combustion gases of high temperatures such as more than 800°C which are produced by igniting the combustible mixture of the secondary fuel and air. It follows that the exhaust gas mixture is burned completely so that the noxious components of the exhaust gases such as hydrocarbons and carbon monoxides are eliminated. The resultant burned gases, which contains no such noxious components, are discharged through the exhaust pipe 16 to the muffler (not shown) and thence to the atmosphere.

Now, it is to be noted that since the combustible mixture of secondary air and fuel is aimed solely at perfect combustion of the noxious unburned components of the exhaust gases, the air-fuel ratio of the combustible mixture should be low, for example, of the order of 20:1 to 50:1.

The amount of secondary fuel supplied to the reactor 20 is controlled by varying the fuel pressure within the pressure chamber 45. The fuel supply unit includes a solenoid valve 55 connected through a conduit 56 to the outlet port 47 of the pressure chamber 45 for controlling the return flow of the secondary fuel therefrom to thereby vary the fuel pressure therein. The secondary fuel flows through the solenoid valve 55 and a conduit 57 and back to the fuel tank 42. Actuation of the solenoid valve 55 is controlled by a control unit 58 electrically connected thereto. In this embodiment, the fuel pump 43 may preferably have a capacity approximately two times as large as the maximum amount of secondary fuel to be supplied to the reactor 20.

A normally closed solenoid valve 59 is provided intermediate a by-pass conduit 60 which is branched from the conduit 56 and leads to the fuel tank 42. The solenoid valve 59 is electrically connected through the engine switch 33 to the battery 34 and is adapted to be opened to allow the secondary fuel to flow from the pressure chamber 45 directly to the fuel tank 42 upon opening of the engine switch 33.

Figure 2:
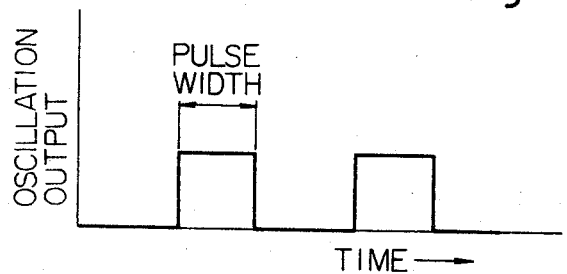
FIG. 2 is a waveform diagram of pulses supplied to the solenoid valve of the system of FIG. 1.

The control unit 58 for controlling the actuation of the solenoid valve 55 comprises an oscillation circuit, a pulse width control circuit and an amplifier circuit connected in series in the order named, although not shown. The pulse width control circuit is also connected through a conductor 62 to the sliding contact of a potentiometer 63 whose resistance is connected through a conductor 64 to the engine switch 33 and thence to the battery 34. The sliding contact is operatively connected to the throttle valve 13 through any suitable linkage as indicated by the dotted line 65, so as to supply a voltage signal representative of throttle opening to the pulse width control circuit. In response to throttle valve opening, the pulse width control circuit operates to vary the width of a pulse signal having a waveform as shown in FIG. 2. The oscillator circuit generates the pulse signal at a certain frequency, for example, 50 Hz, the repetition period in this case being 20 ms. The pulse signal from the pulse width control circuit is amplified by the amplifier circuit and is supplied through a conductor 66 to the solenoid valve 55 for actuation of the same.

Figure 3:
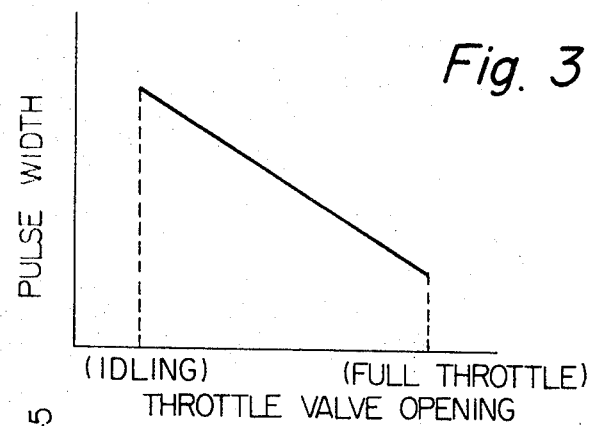
FIG. 3 is a graphic representation showing the relationship between pulse width and throttle valve opening.

FIG. 3 is a plot of pulse width against throttle valve opening for the pulse signal to be supplied from the pulse width control circuit to the amplifier circuit. As seen from the plot, the increase in throttle opening results in the reduction in the pulse width, which leads to the decrease in the time during which the solenoid valve 55 remains opened. Thus, the amount of secondary fuel fed from the pressure chamber 45 back to the fuel tank 42 decreases, with the resultant increase of the secondary fuel introduced into the reactor 20. In the practical example, the pulse width varied in a range of from 5 to 15 ms.

Figure 4:
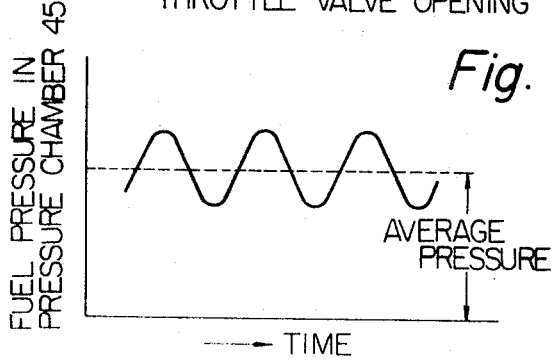
FIG. 4 is a graphic representation showing the variation of the fuel pressure within the pressure chamber shown in FIG. 1.

FIG. 4 shows the manner in which the fuel pressure within the pressure chamber 45 is varied in response to the consecutive actuation of the solenoid valve 55. However, since the rate of change of the fuel pressure is extremely high, the amount of secondary fuel supplied to the reactor combustion chamber 26 is automatically maintained at a value corresponding to the average of the rapidly varying fuel pressure, the value being dependent upon the time that the solenoid valve 55 remains opened. In any case, the slight change of the fuel pressure is not critical to the proper functioning of the fuel supply unit, since the air-fuel ratio of the mixture supplied to the reactor 20 varies in a wide range of from 20:1 to 50:1.

Although this invention has been shown and described in connection with the embodiment in which throttle valve opening is utilized in order to vary the amount of secondary fuel supplied to the reactor in accordance with engine loads, it should be understood that other factors of engine operating conditions representative of the engine loads, such as, for example, intake manifold vacuum, and venturi vacuum can be sensed and utilized instead of throttle valve opening.

It will also be appreciated that it is possible to provide for the fuel supply unit more than two solenoid valves for controlling the return flow of the fuel from the pressure chamber to the fuel tank in order to provide increased controllability of the fuel supply unit.

Further, it will be understood that this invention is also applicable to the fuel injection system for injecting fuel in controlled quantities to engine cylinders.

What is claimed is:

1. An exhaust gas after-burning system for an automotive internal combustion engine having a throttle valve, an intake manifold and engine cylinders, comprising:
    a reactor for oxidizing exhaust gases, said reactor having an inner casing and an outer casing between which an outer chamber is defined, said inner casing having a plurality of openings formed therein providing communication between said outer chamber and an inner chamber defined within said inner casing;
    a main exhaust pipe connecting the engine cylinders to said outer chamber;
    means for supplying air in controlled quantities to said inner chamber, the quantity of the air supplied to said inner chamber being dependent upon engine loads;
    means for supplying fuel in controlled quantities to said inner chamber, said fuel supplying means comprising a fuel reservoir for storing the fuel to be supplied to said inner chamber, a fuel pump having its suction port connected to said fuel reservoir, means defining a pressure chamber and having its inlet connected to the fuel pump discharge and having an outlet, means for allowing the fuel flow from said pressure chamber to said inner chamber of said reactor when the fuel pressure within said pressure chamber exceeds a predetermined value, and means connected to the outlet of said pressure chamber for controlling the return flow of the fuel from said pressure chamber to said fuel reservoir in accordance with engine loads; and
    means for igniting a combustible mixture of the fuel and air supplied to said inner chamber, whereby the exhaust gases discharged into said inner chamber are burned completely at high temperatures due to the combustion of the fuel and air.

2. An exhaust gas after-burning system according to claim 1, wherein said air supplying means comprises an air pump having its discharge coupled to the outer chamber of said reactor, and an air flow control valve connected to the suction port of said air pump for controlling the amount of air supplied to said air pump, said air flow control valve being operatively associated with the engine throttle valve in such a manner as to allow more air to flow therethrough when throttle valve opening increases.

3. An exhaust gas after-burning system according to claim 1, further comprising a nozzle for injecting air into said main exhaust pipe so as to facilitate the reoxidation of the unburned gases emitted from the engine cylinders.

4. An exhaust gas after-burning system according to claim 1, wherein said fuel supplying means further includes a filter provided between said fuel reservoir and said fuel pump inlet to prevent dirt in the fuel from entering said fuel pump.

5. An exhaust gas after-burning system according to claim 1, wherein said means for allowing the fuel flow from said pressure chamber to said inner chamber comprises a normally closed check valve having an outlet and having a movable element biased by a control spring member in one direction, the fuel pressure within said pressure chamber acting to exert a force on said valve control element tending to move it in the opposite direction, whereby said check valve is opened when the fuel pressure exceeds a predetermined value.

6. An exhaust gas after-burning system according to claim 5, wherein the outlet of said check valve has a nozzle for injecting fuel into the inner chamber of said reactor in a sprayed form when said check valve remains opened.

7. An exhaust gas after-burning system according to claim 1, wherein said means for controlling the return flow of the fuel from said pressure chamber to said fuel reservoir comprises a solenoid valve provided between said pressure chamber defining means and said fuel reservoir, and a control device adapted to energize said solenoid valve to open the same in accordance with engine loads.

8. An exhaust gas after-burning system according to claim 7, wherein said control device comprises an oscillation circuit for generating pulses of an equal duration at a predetermined repetition frequency, a pulse width control circuit for varying the width of the pulses generated by said oscillation circuit in accordance with engine loads, and an amplifier for amplifying the pulses to energize said solenoid valve.

9. An exhaust gas after-burning system according to claim 8, wherein said pulse width control circuit is responsive to throttle valve opening to vary the width of the pulses generated by said oscillation circuit.

10. An exhaust gas after-burning system according to claim 1, wherein said fuel supplying means further comprises a by-pass conduit connecting said pressure chamber directly to said fuel reservoir, a normally closed solenoid valve provided in said by-pass conduit, said solenoid valve being adapted to be opened to allow the return flow of the fuel from said pressure chamber to said fuel reservoir through said by-pass conduit when the engine is off.

11. An exhaust gas after-burning system according to claim 1, wherein said igniting means comprises an ignition plug mounted in said reactor to fire the combustible mixture of the fuel and air, and an ignition device for supplying high-voltage surges of current having a predetermined frequency to said ignition plug.

* * * * *